(12) United States Patent
Hiruta et al.

(10) Patent No.: US 11,544,250 B2
(45) Date of Patent: Jan. 3, 2023

(54) FAULT FINDING SUPPORT SYSTEM AND METHOD

(71) Applicant: Hitachi, Ltd., Tokyo (JP)

(72) Inventors: Tomoaki Hiruta, Tokyo (JP); Toshiaki Kono, Tokyo (JP); Takayuki Uchida, Tokyo (JP); Yasuharu Namba, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 420 days.

(21) Appl. No.: 16/686,590

(22) Filed: Nov. 18, 2019

(65) Prior Publication Data

US 2020/0192890 A1 Jun. 18, 2020

(30) Foreign Application Priority Data

Dec. 14, 2018 (JP) .............................. JP2018-234378

(51) Int. Cl.
 *G06F 11/30* (2006.01)
 *G06F 16/23* (2019.01)
 *G06F 16/25* (2019.01)
 *G07C 5/00* (2006.01)
 *G01M 99/00* (2011.01)

(52) U.S. Cl.
 CPC ........ *G06F 16/2379* (2019.01); *G06F 16/252* (2019.01); *G07C 5/00* (2013.01); *G01M 99/005* (2013.01)

(58) Field of Classification Search
 CPC .................................................. G06F 16/2379
 See application file for complete search history.

(56) References Cited

U.S. PATENT DOCUMENTS

2008/0228307 A1 9/2008 Mori et al.
2010/0161546 A1* 6/2010 Yamada ................... G06N 5/04
 706/54

FOREIGN PATENT DOCUMENTS

JP 2008-257700 A 10/2008
JP 2009-211472 A 9/2009
JP 2010-152482 A 7/2010

OTHER PUBLICATIONS

Japanese-language Office Action issued in Japanese Application No. 2018-234378 dated Sep. 20, 2022 with English translation (eight (8) pages).

* cited by examiner

*Primary Examiner* — Phuong Huynh
(74) *Attorney, Agent, or Firm* — Crowell & Moring LLP

(57) ABSTRACT

A fault finding support system is a fault finding support system for instructing a maintenance worker of an appropriate examination location and examination contents using fault knowledge data in which a causal relationship of fault of a target machine is described, the system including: an examination procedure creation unit that creates an examination procedure with respect to the examination location and the examination contents of the target machine using the fault knowledge data, an examination result storage unit that stores an examination history of performing examination using the examination procedure created by the examination procedure creation unit, an update target extraction unit that recommends an update location of the fault knowledge data using the examination history stored in the examination result storage unit, and a user interface that provides a function of displaying a location extracted by the update target extraction unit and updating the fault knowledge data.

10 Claims, 15 Drawing Sheets

FIG. 2

| No. | PARTIAL KNOWLEDGE ID | PART ID | PART | FAULT MODE ID | FAULT MODE | FAULT INFLUENCE ID | INFLUENCE DESCRIPTION | SAFETY INFLUENCE | OPERATION INFLUENCE | FAULT CAUSE ID | FAULT CAUSE |
|---|---|---|---|---|---|---|---|---|---|---|---|
| 1 | KNOWLEDGE 1 | P1 | DOOR | M1.1.1 | UNOPENABLE | E1.1.1 | PASSENGER CANNOT GET ON AND OFF TRAIN | LOW | HIGH | C1.1.1 | DOOR PLATE DOES NOT MOVE |
| 2 | | P1 | DOOR | M1.1.2 | OPENING TIME IS LONG | E1.1.2 | SERVICE DELAY | LOW | MIDDLE | C1.1.2 | DOOR OPEN DETECTION FAILURE |
| 3 | | P1 | DOOR | M1.1.3 | OPENING TIME IS SHORT | E1.1.3 | PASSENGER GETS CAUGHT | HIGH | MIDDLE | C1.1.3 | DOOR PLATE MOVES SLOWLY |
| 4 | | | | | | | | | | C1.1.4 | DOOR PLATE MOVES FAST |
| 5 | | P2 | DOOR RAIL | M1.2.1 | RESISTANCE INCREASE | E1.2.1 | DOOR PLATE OPERATION IS OBSTRUCTED, ABNORMAL NOISE | LOW | MIDDLE | C1.2.1 | ENTERING OF FOREIGN MATTER |
| 6 | | | | | | | | | | C1.2.2 | LOSS OF GREASE |
| 7 | | P3 | DOOR PLATE | M1.3.1 | RESISTANCE INCREASE | E1.3.1 | DOOR PLATE OPERATION IS OBSTRUCTED, ABNORMAL NOISE | MIDDLE | MIDDLE | C1.3.1 | DOOR PLATE DEFORMATION |
| 8 | | P4 | ACTUATOR | M2.4.1 | EXCESSIVELY SMALL OPERATION FORCE | E2.4.1 | OPERATION IS SLOW | LOW | MIDDLE | C2.4.1 | RESISTANCE INCREASE |
| 9 | | | | | | | | | | C2.4.2 | EXCESSIVELY LOW AIR FLOW RATE |
| 10 | | P4 | ACTUATOR | M2.4.2 | EXCESSIVELY LARGE OPERATION FORCE | E2.4.2 | OPERATION IS FAST | HIGH | LOW | C2.4.3 | EXCESSIVELY HIGH AIR FLOW RATE |
| 11 | KNOWLEDGE 2 | P5 | PISTON | M2.5.1 | RESISTANCE INCREASE | E2.5.1 | OPERATION OBSTRUCTION, ABNORMAL NOISE | LOW | MIDDLE | C2.5.1 | LOSS OF GREASE |
| 12 | | P6 | CYLINDER | M2.6.1 | ALIGNMENT ABNORMALITY | E2.6.1 | OPERATION OBSTRUCTION, STOP IN MIDDLE, ABNORMAL NOISE | MIDDLE | LOW | C2.6.1 | LOOSENING OF ATTACHMENT |
| 13 | | P7 | AIR PIPE | M2.7.1 | AIR LEAKAGE | E2.6.7 | OPERATION FORCE REDUCTION, AIR LEAKAGE SOUND | LOW | HIGH | C2.7.1 | CRACKING |
| 14 | | P8 | REGULATING VALVE | M3.8.1 | EXCESSIVELY SMALL AIR FLOW PATH | E3.8.1 | AIR FLOW RATE REDUCTION | LOW | MIDDLE | C3.8.1 | VALVE SETTING ERROR (CLOSED) |
| 15 | KNOWLEDGE 3 | P8 | REGULATING VALVE | M3.8.2 | EXCESSIVELY LARGE AIR FLOW PATH | E3.8.2 | AIR FLOW RATE INCREASE | MIDDLE | MIDDLE | C3.8.2 | VALVE SETTING ERROR (OPEN) |
| 16 | | P8 | REGULATING VALVE | M3.8.3 | FLOW RATE UNSETTABLE | E3.8.3 | UNSTABLE AIR FLOW RATE | MIDDLE | MIDDLE | C3.8.3 | LOOSE REGULATING UNIT |
| 17 | | P9 | REGULATING VALVE | M4.9.1 | EXCESSIVELY SMALL AIR FLOW PATH | E4.9.1 | AIR FLOW RATE REDUCTION | LOW | MIDDLE | C4.9.1 | VALVE SETTING ERROR (CLOSED) |
| 18 | KNOWLEDGE 4 | P9 | REGULATING VALVE | M4.9.2 | EXCESSIVELY LARGE AIR FLOW PATH | E4.9.2 | EXCESSIVE AIR FLOW RATE INCREASE | LOW | MIDDLE | C4.9.2 | VALVE SETTING ERROR (CLOSED) |
| 19 | | | | | | | | | | C4.9.3 | OPENING DUE TO VALVE FAULT |
| 20 | | P9 | REGULATING VALVE | M4.9.3 | AIR FLOW PATH BLOCKAGE | E4.9.3 | NO AIR FLOW | LOW | MIDDLE | C4.9.4 | FOREIGN MATTER CLOGGING |
| 21 | | P9 | REGULATING VALVE | M4.9.4 | AIR LEAKAGE | E4.9.4 | AIR FLOW RATE REDUCTION, AIR LEAKAGE SOUND | LOW | MIDDLE | C4.9.5 | VALVE SETTING ERROR (CLOSED) |

DB2(D2)

DB2 (D2): STRUCTURE DEVELOPMENT DATA

FIG. 5A

LINK TABLE TBL

| SOURCE NODE ~L1 | DESTINATION NODE ~L2 | SCORE ~L3 |
|---|---|---|
| M1.1.1 | P1 | 1 |
| M1.1.2 | P1 | 1 |
| M1.1.3 | P1 | 1 |
| M1.1.1 | E1.1.1 | 10 |
| C1.1.1 | M1.1.1 | 15 |
| M1.1.2 | E1.1.2 | 30 |
| ... | ... | ... |

FIG. 5B

NODE TABLE TBN

| NODE ID ~N1 | SCORE ~N2 | WORKING TIME ~N3 | ADDITIONAL INFORMATION ~N4 |
|---|---|---|---|
| P1 | 1 | - | LINK TO DOOR DOCUMENTATION MANUAL |
| M1.1.1 | 10 | 5 min | LINK TO UNOPENABLE DOOR INVESTIGATION MANUAL |
| E1.1.1 | 20 | - | LINK TO COUNTERMEASURE MANUAL |
| C1.2.2 | 30 | 15min | LINK TO GREASE LOSS INVESTIGATION AND COUNTERMEASURE MANUAL |
| ... | ... | ... | ... |

D30 {
USER ID           100001
ASSET ID          200-001
CAUSE NODE ID     C1.2.2
START TIME        2018-9-19 16:05:01
END TIME          2018-9-19 16:55:01
MAINTENANCE WORK  GREASE INJECTION
}

| Timestamp (D31) | NODE ID (D32) | WORKING TIME [min] (D33) |
|---|---|---|
| 2018-9-19 16:05:01 | P1 | 0 |
| 2018-9-19 16:05:01 | M1.1.2 | 10 |
| 2018-9-19 16:15:01 | C1.1.3 | 5 |
| 2018-9-19 16:20:01 | E1.2.1 | 5 |
| 2018-9-19 16:25:01 | M1.2.1 | 10 |
| 2018-9-19 16:35:01 | C1.2.2 | 20 |

NODE INFORMATION

LINK SEGMENT

FIG. 10A

MAIN NODE

NODE ID M1.1.2
BRANCH AMOUNT 100

| NEXT NODE ID | BRANCH RATE |
|---|---|
| C1.1.2 | 20% |
| C1.1.3 | 40% |
| M1.1.3 | 40% |

FIG. 10B

LINK SEGEMNT

| SOURCE NODE | FREQUENCY | AVERAGE WORKING TIME [min] |
|---|---|---|
| M1.1.2 | 100 | 10 |
| C1.1.3 | 20 | 15 |
| E1.2.1 | 18 | 15 |
| M1.2.1 | 15 | 20 |
| C1.2.2 | | |

| SOURCE NODE | DESTINATION NODE | FREQUENCY | NUMBER OF ERRORS |
|---|---|---|---|
| NODE A | NODE C | 50 | 30 |
| NODE C | NODE D | 40 | 30 |

START → READ INVESTIGATION RESULT AND FAULT KNOWLEDGE DATA (S301) → ALL HISTORY PROCESS (START) (S3021) → CALCULATE WORKING TIME STATISTIC (S303) → ALL HISTORY PROCESS (END) (S3022) → EXTRACTION (S304) → TRANSMIT RESULT TO DATA UPDATE UNIT (S305) → END

| NODE ID | WORKING TIME [min] | | |
|---|---|---|---|
| | AVERAGE VALUE | STANDARD DEVIATION | MAXIMUM VALUE |
| M1.1.2 | 10 | 1 | 20 |
| C1.1.3 | 15 | 3 | 30 |
| E1.2.1 | 15 | 4 | 16 |
| M1.2.1 | 20 | 10 | 60 |

FAULT FINDING SUPPORT SYSTEM AND METHOD

CLAIM OF PRIORITY

The present application claims priority from Japanese Patent Application JP 2018-234378 filed on Dec. 14, 2018, the content of which are hereby incorporated by references into this application.

BACKGROUND OF THE INVENTION

1. Field of the Invention

The present invention relates to a fault finding support system and method for supporting fault finding in equipment.

2. Description of Related Art

In many fields of infrastructure, railways, industrial equipment, medical equipment, and the like, it is necessary to maintain predetermined performance by continuously performing maintenance after the introduction of assets, which are various equipment and facilities. The status of a target asset is collected, the presence of abnormality and problems are analyzed and diagnosed, and an appropriate maintenance work is applied.

In asset diagnosis, as a result of examination of a maintenance worker, information from a sensor attached to an asset is integrated and a fault location is gradually narrowed to specify equipment to be subjected to a process such as replacement, repair, or restoration. At this time, the maintenance worker has knowledge about a target asset and general engineering knowledge.

With the development of information technology in recent years, diagnosis support for complementing the lack of target asset knowledge and engineering knowledge of a maintenance worker by instructing the maintenance worker of an appropriate examination location and examination contents, or instructing an efficient examination order has been in practical use. In order to realize such a diagnosis support system, fault knowledge data in which the relationship between the fault of the target asset and its cause is arranged is required.

In order to improve the accuracy of fault finding of the above diagnosis support system, it is important to improve the quality of fault knowledge data.

JP-A-2010-152482 discloses, as a method of reducing a load of updating causal relationship information for fault diagnosis, a method of "selectively updating individual causal relationship information for each type stored in a causal relationship information storage unit 10 using update information" by dividing the causal relationships into a common causal relationship and an individual causal relationship and managing the causal relationships. A specific update method is defined in advance in a model action selection unit.

Since the technique disclosed in JP-A-2010-152482 performs an update work according to a predetermined update action, the update range is limited. This updated contents does not reflect the actual examination work history of a maintenance worker.

In order to improve the quality of fault knowledge data, curation in which collected information is categorized and linked with intention of adding value to share the information is important. It is important that this curation is conducted by an engineer having machine knowledge with initiative based on the examination work history of a maintenance worker.

However, it takes time for the engineer to specify a location to be updated from complicated and vast amount of fault knowledge data. Therefore, when the engineer updates the fault knowledge data by the update using the examination work history of the maintenance worker, a mechanism for shortening the working time is desired.

SUMMARY OF THE INVENTION

An object of the present invention is to provide a fault finding support system and method having a function of narrowing a location to be updated in fault knowledge data using an examination history of fault finding.

In order to achieve the above object, according to an aspect of the present invention, there is provided "a fault finding support system for instructing a maintenance worker of an appropriate examination location and examination contents using fault knowledge data in which a causal relationship of fault of a target machine is described, the system including an examination procedure creation unit that creates an examination procedure with respect to the examination location and the examination contents of the target machine using the fault knowledge data; an examination result storage unit that stores an examination history of performing examination using the examination procedure created by the examination procedure creation unit; an update target extraction unit that recommends an update location of the fault knowledge data using the examination history stored in the examination result storage unit; and a user interface that provides a function of displaying a location extracted by the update target extraction unit and updating the fault knowledge data".

According to the aspect of the present invention, it is possible to shorten the update time of the fault knowledge data of an engineer by searching for a location to be noticed using a fault finding history of a maintenance worker when the fault knowledge data is updated and showing the result to the engineer.

Problems, configurations, and effects other than those described above will become apparent from the following description of embodiments.

BRIEF DESCRIPTION OF THE DRAWINGS

FIG. 2 is a diagram showing an example of fault knowledge data D2 stored in fault knowledge data storage unit DB2;

FIG. 5A is a diagram showing an example of a link table that stores information related to links in the same target part in the graph of FIG. 4;

FIG. 5B is a diagram showing an example of a node table that stores information related to nodes in the same target part in the graph of FIG. 4;

FIG. 7A is a diagram showing an example of a data format of an examination result storage unit DB3;

FIG. 10A is a diagram showing an example of a description of a main node obtained by a process in process step S105 of FIG. 9;

FIG. 10B is a diagram showing an example of a description of a link segment obtained by the process in process step S105 of FIG. 9;

DESCRIPTION OF EMBODIMENTS

Hereinafter, a fault finding support system and method according to an embodiment of the present invention will be described with reference to the drawings.

Embodiment

Figure 1:
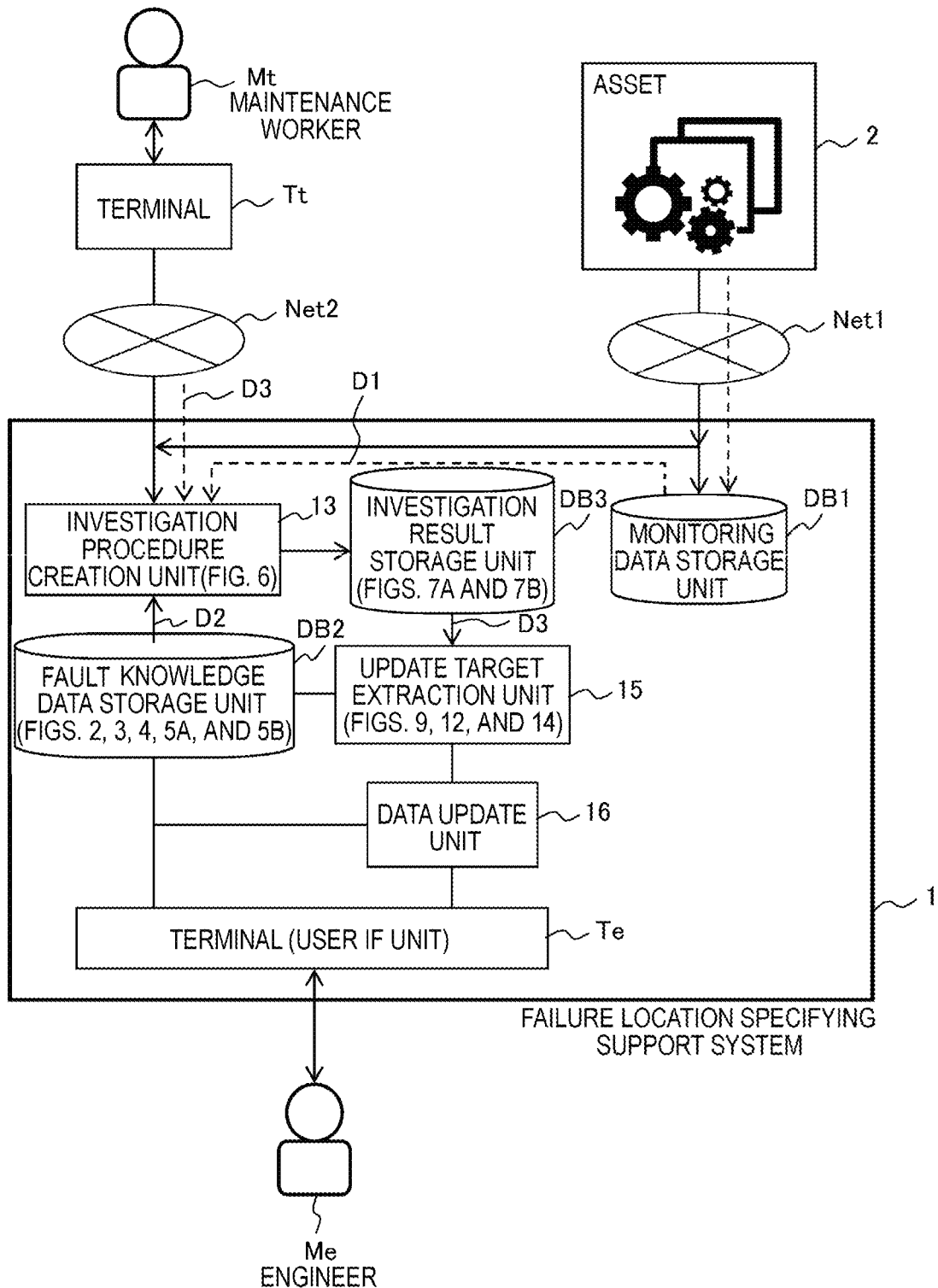
FIG. 1 is a diagram showing an example of the configuration of a fault finding support system according to an embodiment of the present invention.

FIG. 1 shows an example of the configuration of a fault finding support system according to an embodiment of the present invention. A fault finding support system 1 of FIG. 1 is realized by a computer system such as a control computer, a personal computer, or a workstation, and is configured by appropriately connecting assets 2 to be diagnosed, a terminal Tt used by a maintenance worker Mt who specifies a fault location of the assets 2, a terminal Te used by an engineer Me who curates fault knowledge data, and the like.

The fault finding support system 1 and the assets 2 or the terminals Tt and Te are appropriately connected via communication systems NET1 and NET2, and the terminals Tt and Te include an input unit such as a keyboard and an output unit such as a monitor.

First, equipment to be connected to the fault finding support system 1 and contents thereof will be described.

In the assets 2 which are various equipment and facilities to be monitored, a sensor or an alarm system is attached, and the data is stored in a monitoring data storage unit DB1 of the fault finding support system 1.

The terminal Tt is used by the maintenance worker Mt. Information related to the examination result input by the maintenance worker Mt via the input unit of the terminal Tt is transmitted to an examination procedure creation unit 13 of the fault finding support system 1. At the same time, the terminal Tt receives information related to an examination procedure created by the examination procedure creation unit 13 of the fault finding support system 1 and displays the information on the output unit such as a monitor.

On the other hand, the terminal Te (interface unit) is used by the engineer Me. The engineer Me instructs data update via the input unit of the terminal Te, and displays the data update result on the output units such as a monitor.

The engineer Me using the terminal Te has knowledge about the assets 2. On the other hand, the maintenance worker Mt has at least knowledge about an asset that can be used to specify a fault location in the assets 2 with reference to the information from the terminal Tt. In addition, the maintenance worker Mt may be a call center worker who gives instructions to an asset owner or a worker remotely in addition to a worker who works on site. There may be a plurality of maintenance workers Mt and engineers Me.

Next, the fault finding support system 1 realized by the computer system includes, in terms of its function, as shown in FIG. 1, the monitoring data storage unit DB1, a fault knowledge data storage unit DB2, an examination result storage unit DB3, the examination procedure creation unit 13, an update target extraction unit 15, a data update unit 16, and the terminal Te which is a user interface unit. Here, the function of each of the examination procedure creation unit 13, the update target extraction unit 15, and the data update unit 16 is realized by executing a predetermined program by a computer processing unit (CPU). The terminal Tt also has the terminal Te which is a user interface unit, but is handled as an external device here.

When these functions are expressed very simply, the fault finding support system 1 may be a system having a function of supporting fault finding by utilizing fault knowledge data D2, monitoring data D1, and examination result data D3 of the maintenance worker Mt, and a function of updating the fault knowledge data D2 by using an examination history of the maintenance worker Mt.

The present invention is not limited to a specific asset, a diagnosis technique, and an analysis technique, but the following description will be made by taking the diagnosis of a passenger car door of a railway as an example.

As storage units (database) DB for accumulating and storing the data used in the fault finding support system 1, the monitoring data storage unit DB1 for storing the monitoring data D1, the fault knowledge data storage unit DB2 for storing the fault knowledge data D2, and the examination result storage unit DB3 for storing examination result data D3 are provided. The stored contents of these databases are as follows.

First, the monitoring data storage unit DB1 is connected to a target asset 2 via the network NET1, and regularly or irregularly collects and stores event data such as operation data for the target asset 2 or an alarm as monitoring data D1. Here, the accumulated monitoring data D1 is used in the examination procedure creation unit 13.

The fault knowledge data storage unit DB2 stores the fault knowledge data D2. The fault knowledge data D2 is information on the structure of the target asset 2, a fault mode, the relationship between functional fault and fault mode, the relationship between functional fault and fault effect, and the relationship between a phenomenon observed at the time of fault and a fault mode. In addition, in the fault knowledge data D2, there is no need to record the fault knowledge about the entire target asset 2 in a single relationship network, and the fault knowledge created for each part of the structure of the target knowledge or function may be stored. Further, the structure development data for the entire target asset 2 is also recorded.

The examination result storage unit DB3 stores the examination history of the maintenance worker Mt written from the examination procedure creation unit 13 as the examination result data D3.

When the process contents of the calculation function of each unit (the examination procedure creation unit 13, the update target extraction unit 15, and the data up date unit 16) in the fault finding support system 1 according to the embodiment of the present invention are described, the data first used here will be specifically described. First, the specific structure or the fault knowledge data D2 stored in the fault knowledge data storage unit DB2 and the contents thereof will be described using FIGS. 2, 3, 4, 5A, and 5B.

FIG. 2 shows an example of the fault knowledge data D2 to be recorded in the fault knowledge data storage unit DB2. In the fault knowledge data storage unit DB2, vertical and horizontal items are set, knowledge is stored in the vertical axis direction and the fault knowledge data D2 for each knowledge is stored in the horizontal axis direction on a matrix. In the drawing, knowledge 1, 2, 3, and 4 is illustrated as knowledge (partial knowledge ID), knowledge 1 is related to a door of target facility equipment, knowledge 2 is related to an actuator, and knowledge 3 and 4 is related to a regulating valve.

As the fault knowledge data D2 on the horizontal axis, a target part D2P, a fault mode D2M, a fault cause D2C, and a fault effect D2E are described.

According to this description example, the knowledge 1 related to a door is related to a door P1, a door rail P2, and a door plate P3 for the target part D2P, the fault modes D2M for each target part P are respectively "Unopenable M1.1.1", "Opening time is short M1.1.2", and "Opening time is long M1.1.3", the fault effects D2M for each fault mode D2M are respectively "Passenger cannot get on and off train E1.1.1", "Service delay E1.1.2", and "Passenger gets caught E1.1.3", and the fault causes D2C for each fault effect D2E are respectively "Door plate does not move C1.1.1", "Door open detection fault C1.1.2 or Door plate moves slowly C1.1.3", and "Door plate moves fast C1.1.3" are shown. The fault knowledge data storage unit DB2 which is a database is configured such that data in association with these states is stored. The detailed description will be omitted, but the other knowledge 2, 3, and 4 is configured in the same way of thinking.

The fault knowledge data D2 is not created all at once but is updated sequentially via the data update unit 16 by the engineer Me who is a partial expert knowledge holder of the assets 2.

Figure 3:
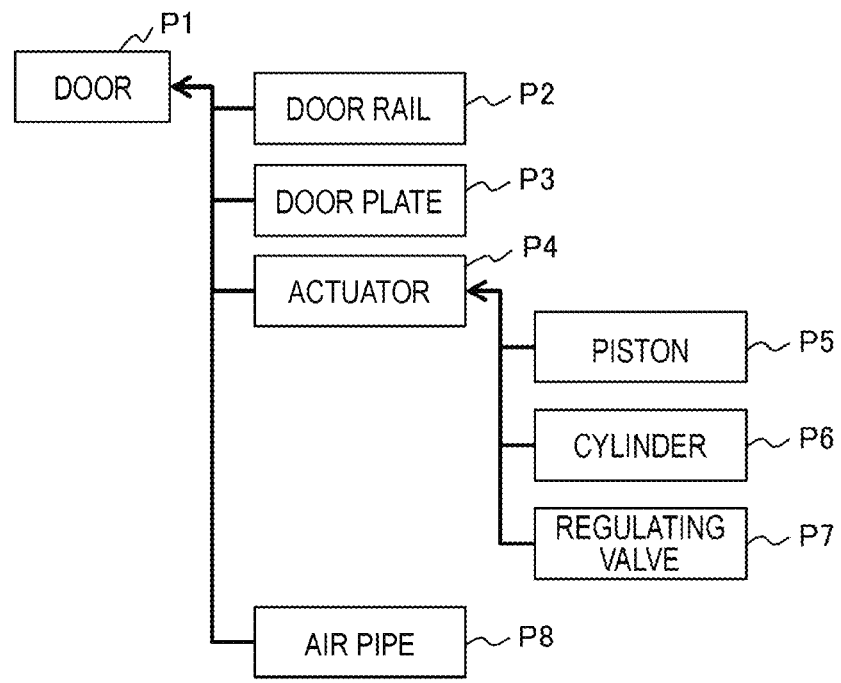
FIG. 3 is a diagram showing an example of structure development of an asset.

In addition, the fault knowledge data storage unit DB2 also records data showing an example of asset structure development as shown in FIG. 3. According to the example of the structural development between the parts P in FIG. 3, when an upper functional part is a door P1, lower functional parts are a door rail P2, a door plate P3, an actuator P4, and an air pipe P8. Further, when the upper functional part is the actuator P4, the lower functional parts are a piston P5, a cylinder P6, and a regulating valve P7. The knowledge 1 to knowledge 4 in FIG. 2 are an aggregate of the main parts (P1 to P8) that configure the equipment, and represent the link and connection between the main parts in FIG. 3.

In this manner, each line of the fault knowledge data D2 shown in FIG. 2 represents a combination of the target part D2P, the fault mode D2M, the fault cause D2C, and the fault effect D2E, and is considered as a small unit of fault knowledge in the present invention. Here, by adding the relationship of the fault cause D2C and the fault effect D2E between each element in the fault knowledge data D2, it is possible to describe what causes the fault effect D2E. For the fault effect D2E caused in a certain part, the fault effect D2E is caused by which fault mode D2M, and the fault mode D2M is caused by which fault cause D2C is described as the relationship between each data ID.

In addition, between different parts P, when a fault occurs in a part that provides a lower function, it is possible to describe the causal chain in which the fault effect D2E becomes the fault cause D2C of a higher function.

Figure 4:
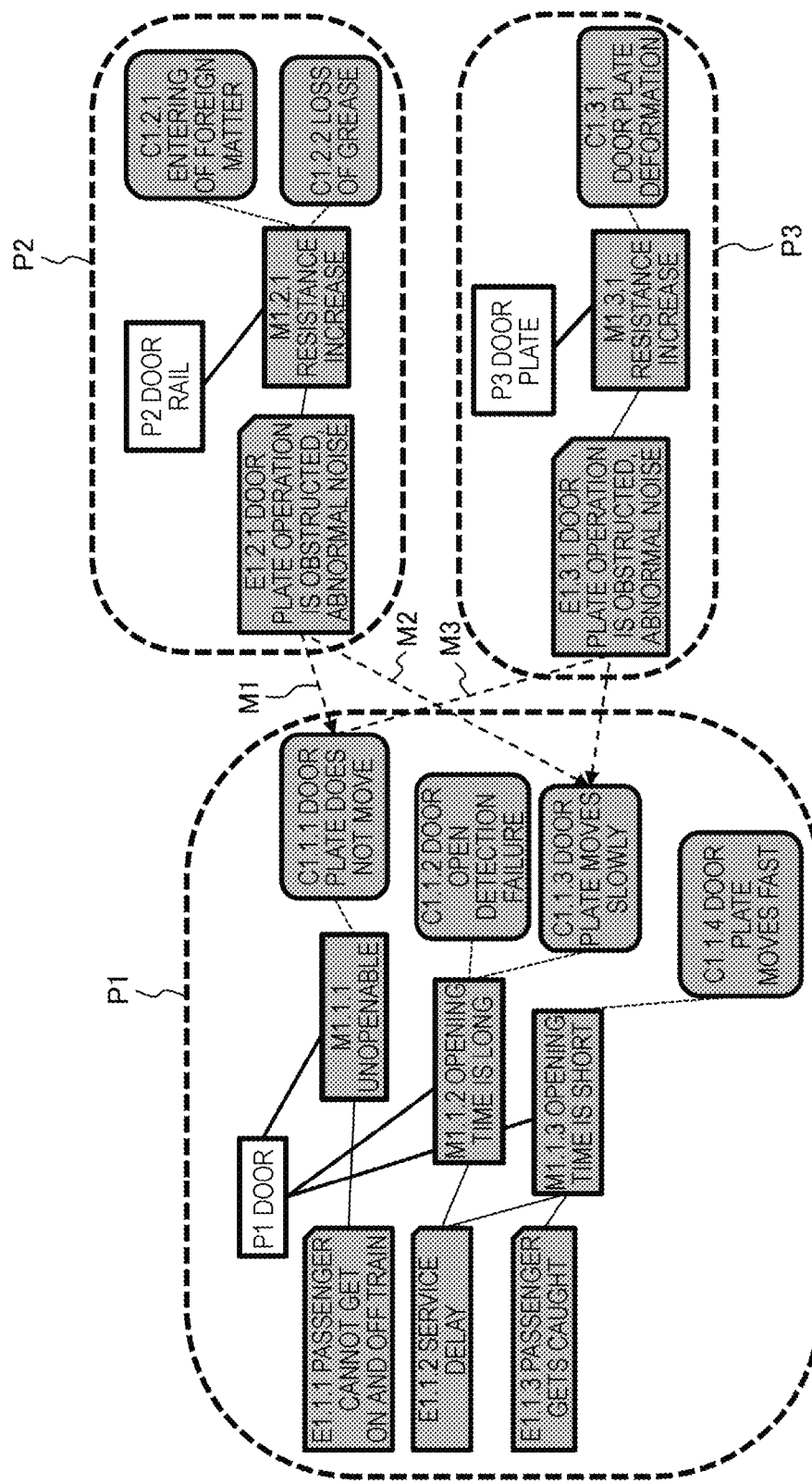
FIG. 4 is a diagram showing the fault knowledge data D2 in a graph format.

FIG. 4 shows the fault knowledge data D2 expressed in a graph format. In the following explanation, this graph format will be mainly used for description. According to the description of FIG. 4, when the target part D2P in the upper left side is the door P1, similarly, when the target part D2P in the upper right side is the door rail P2, or the target part D2P in the lower right side is the door plate P3, the fault mode D2M, the fault cause D2C, and the fault effect D2E are specifically related.

In the fault knowledge data D2 in FIG. 2, these relationships are for parts with independent relationships, respectively, but by adding the relationship of the fault cause D2C and the fault effect D2E between each element in the fault knowledge data D2, these relationships can be cooperated and linked with each other from the viewpoint of the fault cause D2C and the fault effect D2E.

In the example of FIG. 4, there is a mutual relation M1 between "Door plate operation is obstructed, abnormal noise E1.2.1" which is the fault effect M2E of the door rail P2 as the target part D2P and "Door plate does not move C1.1.1" which is the fault cause M2C of the door P1 as the target part D2P.

In addition, two sets of mutual relations are recognized. There are a mutual relation M2 between "Door plate operation is obstructed, abnormal noise E1.2.1" which is the fault effect M2E of the door rail P2 as the target part D2P and "Door plate moves slowly C1.1.3" which is the fault cause M2C of the door P1 as the target part D2P, and a mutual relation M3 between "Door plate operation is obstructed, abnormal noise E1.3.1" which is the fault effect M2E of the door plate P3 as the target part D2P and "Door plate does not move C1.1.1" which is the fault cause M2C of the door P1 as the target part D2P.

The grasp of the mutual relation M in the graph format of FIG. 4 may be expressed in the data format expressed by a node and a link in the handling of data as the premise. FIGS. 5A and 5B show examples of a link table TBL and a node table TBN when grasped by the data format. These data formats in FIGS. 5A and 5B are also managed as part of the fault knowledge data D2 in the fault knowledge data storage unit DB2. The data format in FIG. 5A shows the link table TBL in the same target part and links between a plurality of target parts are not considered.

The link table TBL in FIG. 5A stores information about links in the same target part of the graph in FIG. 4. The link table TBL specifically includes an ID (not shown) for identifying a link, a node ID of a source node L1 that is the start point of a link, a node ID of a destination node L2 that is the arrival point of a link, and a score L3 that shows the importance of a link.

In addition, in FIG. 5A, a case of knowledge 1 about the door P as the same target part D2P is shown as an example, and focusing on a part ID, a fault mode ID, a fault effect ID, and a fault cause ID in FIG. 2 as nodes (source node L1 and destination node L2), the link relationships between these are covered. In FIG. 5A, in 3 upper cases, the connection relationship with the part ID as the destination node and the fault mode ID as the source node is grasped as a link, and in 3 lower cases, the connection relationship among the fault mode ID, the fault effect ID, and the fault cause ID is grasped as a link. Although not shown here, other knowledge is created in the same manner.

In FIG. 5A, the score L3 is assigned to each of these links. The score L3 is generally set to be low for a part that can be confirmed from the outside, such as a door, and is set to be higher when the internal confirmation is difficult, or higher when the effect is large. This score is used in the procedure of the examination procedure creation unit 13. A high score link is preferentially selected for an examination procedure.

The node table TBN in FIG. 5B stores information about nodes (source node L1 and destination node L2). The node table TBL specifically includes anode ID (N1) for identifying a node, a score N2 representing the importance of a node, information N3 of working time related to anode, and additional information N4 such as manuals. The detailed information on the node can be obtained by searching for the table in FIG. 2 using the node ID (N1) as a key.

In the node table TBN, for example, when the node is "M1.1.1 Door unopenable", the node ID (N1) is M1.1.1. In addition, for the working time N3, for example, 5 minutes are stored as actual working time (statistical value here) of standard working time for confirming that the door is unopenable and working time inputted by the data update unit 16. In addition, in the additional information N4, the link of a procedure manual for confirming that the door is unopenable (here, unopenable door examination manual) and door drawing information are stored.

According to the data formats of the link table TBL and the node table TBN shown in FIGS. 5A and 5B, it is apparent that the connection relationships shown in FIG. 4 can be expressed as data.

The above description using FIGS. 2 to 5B is related to the specific configuration of the fault knowledge data D2 recorded in the fault knowledge data storage unit DB2 and the contents thereof, but by using such fault knowledge, it is possible to provide a guidance for fault examination. For example, in the description of the graph format in FIG. 4, in a case where a worker receives a report "door open is very slow and service is delayed", by actually performing door examination from the nodes "E1.1.2 Service delay" and "M1.1.2 Opening time is long", fault effects "C1.1.3 Doorplate moves slowly", "E1.2.1 Door plate operation is obstructed", and M1.2.1 Resistance increase" are brought, and finally, when "C1.2.2 Loss of grease" can be confirmed, a process of adding grease to the door rail P2 can be performed.

Next, the process of the examination procedure creation unit 13 will be described. The examination procedure creation unit 13 creates the following examination procedure using the information D2 of the fault knowledge data storage unit DB2 and the information D1 of the monitoring data storage unit DB1, and the examination result data D3 of the maintenance worker Mt from the terminal Tt, and transmits the data to the terminal Tt. When the examination is completed, the examination history is stored in the examination result storage unit DB3. The examination procedure creation unit 13 is operated by repeatedly inputting the examination stage results from the terminal Tt and reflecting the results.

Figure 6:
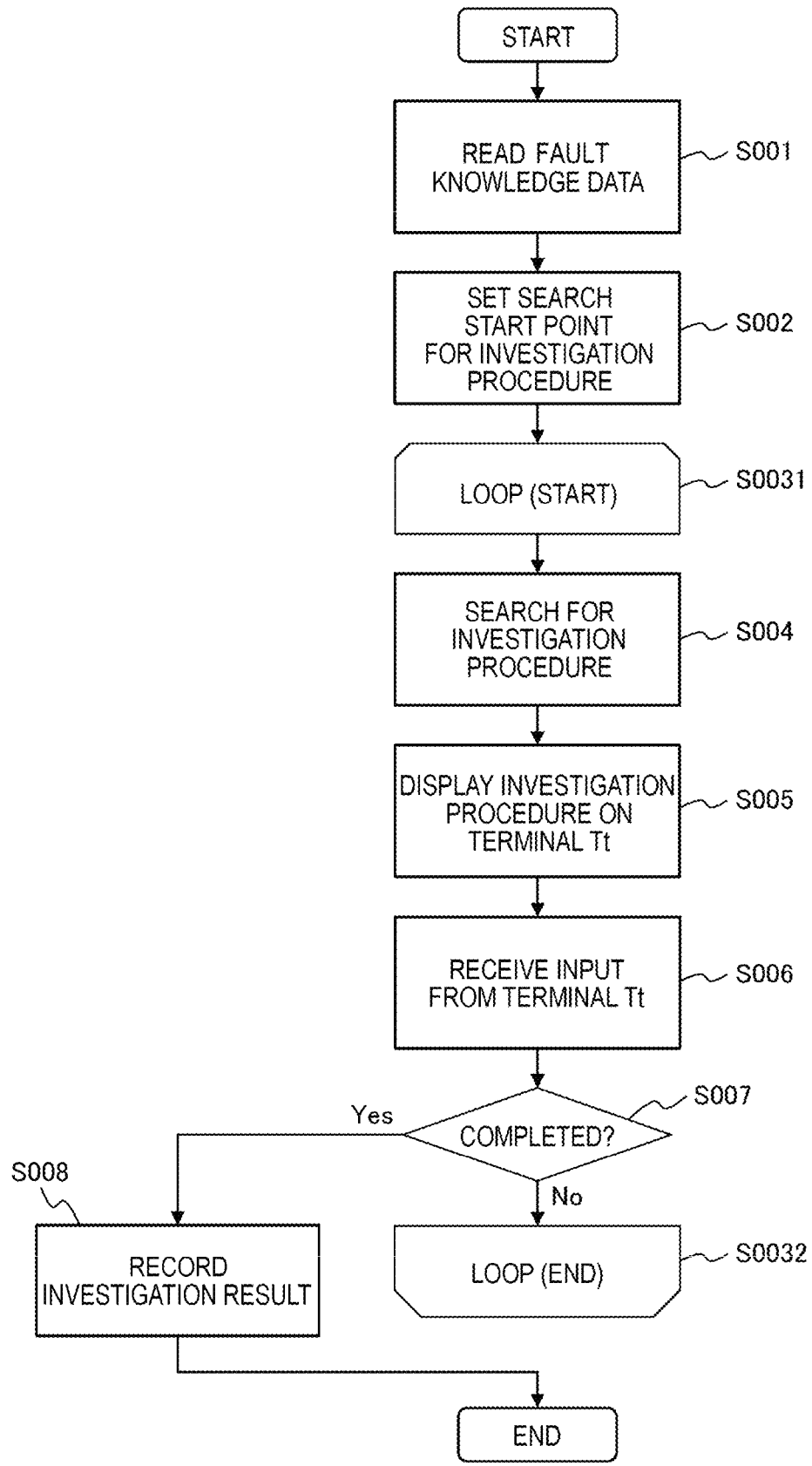
FIG. 6 is a diagram showing an example of a process flow of an examination procedure creation unit 13.

The process of the examination procedure creation unit 13 is shown in FIG. 6. In initial process step S001 in FIG. 6, related information is read from the fault knowledge data storage unit DB2 and the monitoring data storage unit DB1. For example, in FIG. 2, knowledge 1, 2, 3, and 4 is read as door-related information.

In process step S002, a part that will be the start point of the examination procedure is determined. Here, a part with the highest connection relationship is selected. A door P1 is selected in this embodiment. Alternatively, before the maintenance worker Mt starts examination, in a case where there is a previous fault state report or event information in the monitoring data storage unit DB, apart specified in the above case or apart with the highest content matching with the phenomenon of the specified fault is used. The door P1, which is the highest part, is selected.

Next, until a fault location is specified, a loop process from S0031 to S0032 is continued while the examination procedure is being presented to the maintenance worker Mt, the input reception of the examination stage result and the result reflection is being repeatedly performed.

In initial process step S004 in the loop process, when the examination procedure is presented to the maintenance worker Mt via the terminal Tt, a favorable order to follow the network of the fault knowledge data is searched. In this examination work search process, using the score L3 of the node table TBN of the fault knowledge data storage unit DB2, the score N2 of the link table TBL, and the working time N3 of the node table TBN, the examination procedure is searched so that the total score is maximized.

This score may be updated dynamically in the following manner. For example, in a case where the information D1 of the monitoring data storage unit DB1 includes an alarm, anode related to the alarm is searched and the score of the node is increased. In addition, in a case where the presented examination procedure is correct as the examination stage result from the terminal Tt the score of the next node and link of the current node is increased. On the other hand, in a case where there is an error, the network after the current node is less likely to be selected by reducing the score. The searching may be performed using an algorithm that calculates the optimum route using the weights of the nodes and links, such as a Dijkstra method often used in a car navigation system.

In process step S005, the result of process step S004 is displayed on the terminal Tt. Next, in process step S006, the input result of the maintenance work of the maintenance worker Mt is received from the terminal Tt. In process step S007, whether or not fault finding completion information is received from the terminal Tt is checked. In a case of No in process step S007, the loop process from S0031 to S0032 is continued. In a case of Yes in process step S007, the examination history in process step S008 is written to the examination result storage unit DB3 as the examination result data D3.

Thus, in the examination result storage unit DB3, the maintenance work history of the maintenance worker Mt written from the examination procedure creation unit 13 is stored as the examination result data D3.

Figure 7B:
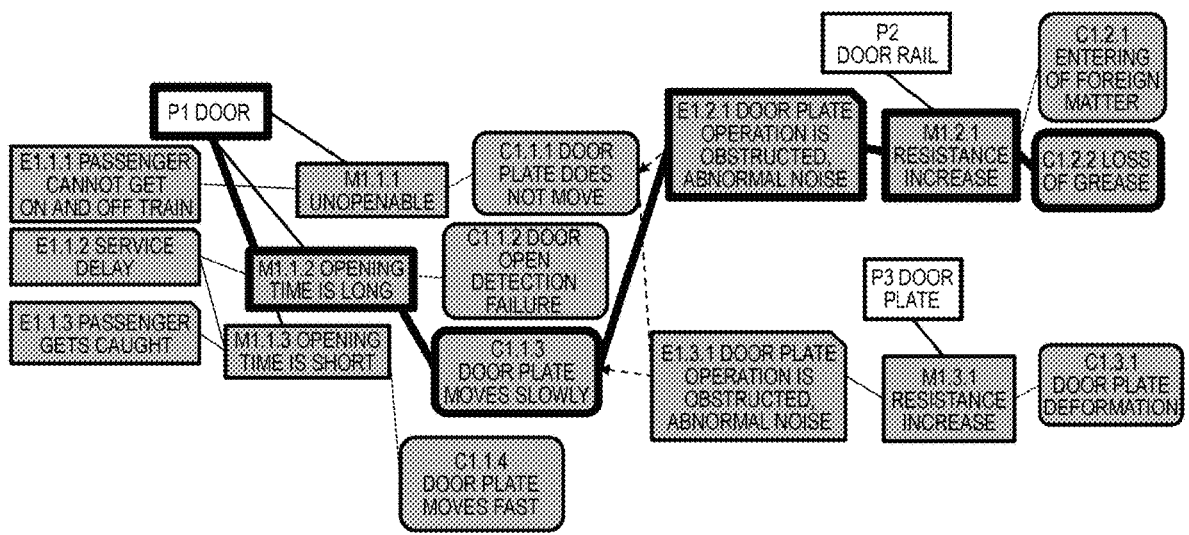
FIG. 7B is a diagram in which a maintenance history of FIG. 7A is mapped to fault knowledge.

FIG. 7A shows an example of a data format of the examination result storage unit DB3. In addition, FIG. 7B is a diagram in which the maintenance history of FIG. 7A is mapped to the fault knowledge.

In the data format of the examination result storage unit DB3 in FIG. 7A, a worker who performed the maintenance work (user ID), equipment (asset ID), a cause node ID that can specify the examination result, date and time (start and end time), maintenance work name, and the like are described as bibliographic data D30, and in addition, the examination history up to the cause node specification is stored in a chronological order. Specifically, a time stamp (start and end time), a node D32, and working time D33 are saved in the format described. In the examination result storage unit DB3, the data format of the examination history created each time the fault cause was clarified is accumulated sequentially.

According to this record, the maintenance work procedure until the cause node ID is specified is started from the door P1, the cause is sequentially clarified in the order of Door open time is long (M1.1.2)⇒Door plate moves slowly (C1.1.3), next, the operation of the door plate is obstructed with respect to the door rail P2, and the cause is clarified in the order of Abnormal noise is generated (E1.2.1)⇒Resistance increases (M1.2.1)⇒Grease is lost (C1.2.2) as a procedure. The time required for each clarification work is recorded for each part. FIG. 7B is a diagram in which the maintenance history in FIG. 7A is mapped in the graph expression format of the fault knowledge data in FIG. 4.

Next, the update target extraction unit 15 will be described. The update target extraction unit 15 extracts the update target of the fault knowledge data D2 using the examination work history (examination result data D3) stored in the examination result storage unit DB3. In the embodiment, as an example of the update target extraction, an example in which A1: a main node and a link segment, A2: a node with many errors, and A3: a node with a long working time are set as extraction points is described.

First, the extraction point A1 (main node and link segment) will be described. Here, the main node is a node through which a maintenance worker highly frequently passes during the examination and that have many branches. In addition, the link segment is a set of a plurality of links and a plurality of nodes between major nodes. Examples of the outline of the main node will be described with reference to FIG. 8A, and the outline of the link segment will be described with reference to FIG. 8B.

Figure 8A:
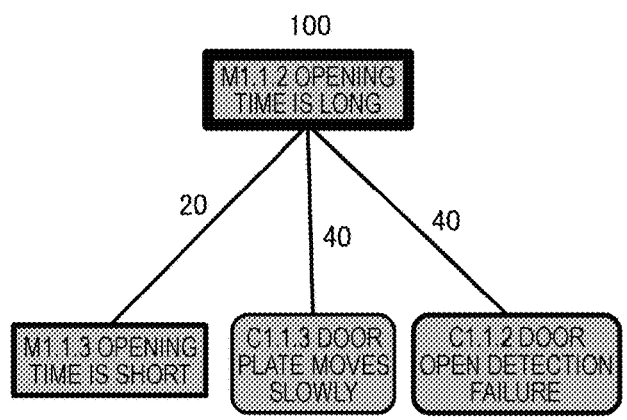
FIG. 8A is a diagram showing an outline of a main node.

FIG. 8A shows a result of aggregation of the examination work history D3 in the fault knowledge data D2. With regard to the aggregation result, here, the relationships between the node M1.1.2 "open time is long", the node M1.1.3 that is in phase with the node M1.1.2, C1.1.3, and C1.1.2 are shown as Examples. In addition, the number of transitions from the node M1.1.2 to other nodes is 100 times, and the ratios are, for example, 20%, 40%, and 40%. Similar analysis is conducted for other nodes.

Among many analysis cases, in this case, as the main nodes, the node M1.1.2 and the node C1.2.2 "Loss of grease" are extracted. The node M1.1.2 is extracted as the main node because many maintenance workers Mt pass through the node M1.1.2 (in this embodiment, 100 times), and further, the ratios per number of inputs to the nodes "M1.1.3", "C1.1.3" and "C1.1.2" branched from the node M1.1.2 from the node M1.1.2 are 20%, 40%, and 40% and the nodes are branched with little deviation.

In contrast, assuming that most maintenance workers Mt, such as 95%, 3%, 2%, proceed to M1.1.3, in this case, the node is not a big branching point, and thus is not extracted as the main node. That is, the reason is that the main node is a node having a large number of passes and is that many maintenance workers Mt are wondering where to go when moving to the next work step.

The standard for extracting the main node here is determined by the number of times the maintenance worker Mt reaches the target node, and the ratio (branch rate) of reaching the next node to the number of times of reaching the target node. For example, the number of times of reaching "node ID: A" is 100 times, and the number of times of reaching the next nodes "node ID: B" and "node ID: C" are respectively 60 times and 40 times. The branch rates are 60% and 40%, respectively. At this time, the target node A is a node that has a high passing frequency and is easily branched, and thus, the node is extracted as the main node.

Figure 8B:
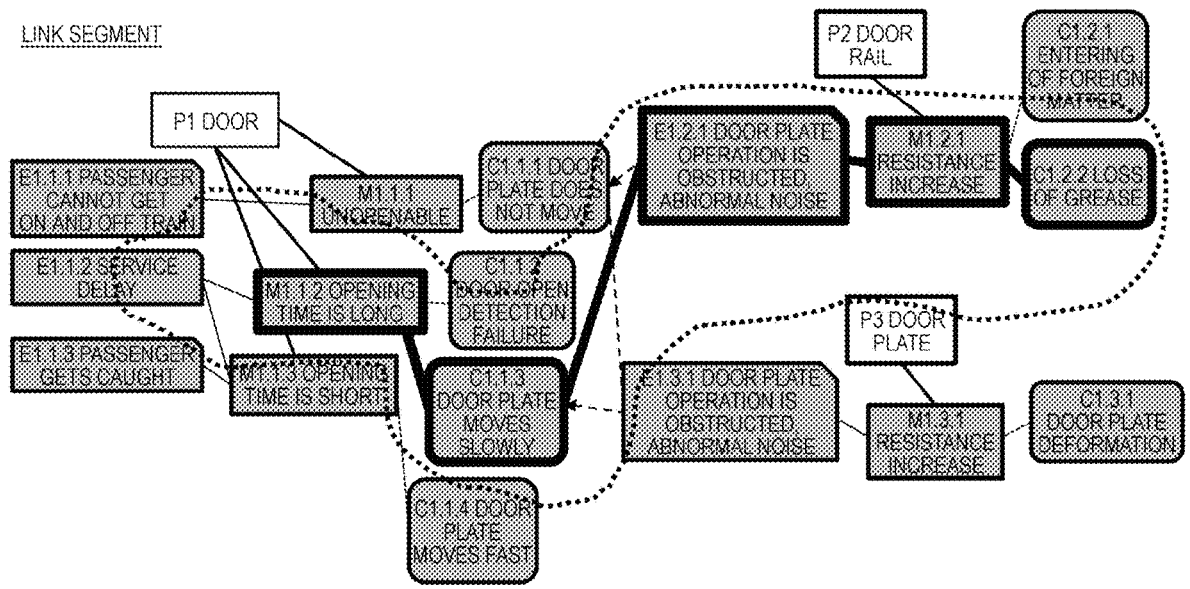
FIG. 8B is a diagram showing an outline of a link segment.

In FIG. 8B, "link segment" a group of links through which the maintenance workers Mt are commonly pass. In the example of FIG. 8B, a group of links from M1.1.2⇒C1.1.3⇒E1.2.1⇒M1.2.1⇒C1.2.2 is a link segment. The start point of the link segment (node M1.1.2) and the end point (node C1.2.2) are main nodes and the node between the start point and the end point is not a main node.

Since these main nodes and the link segment are a set of nodes and links that are easy for the maintenance workers Mt to pass through in common, the engineer Me has to focus on updating.

Figure 9:
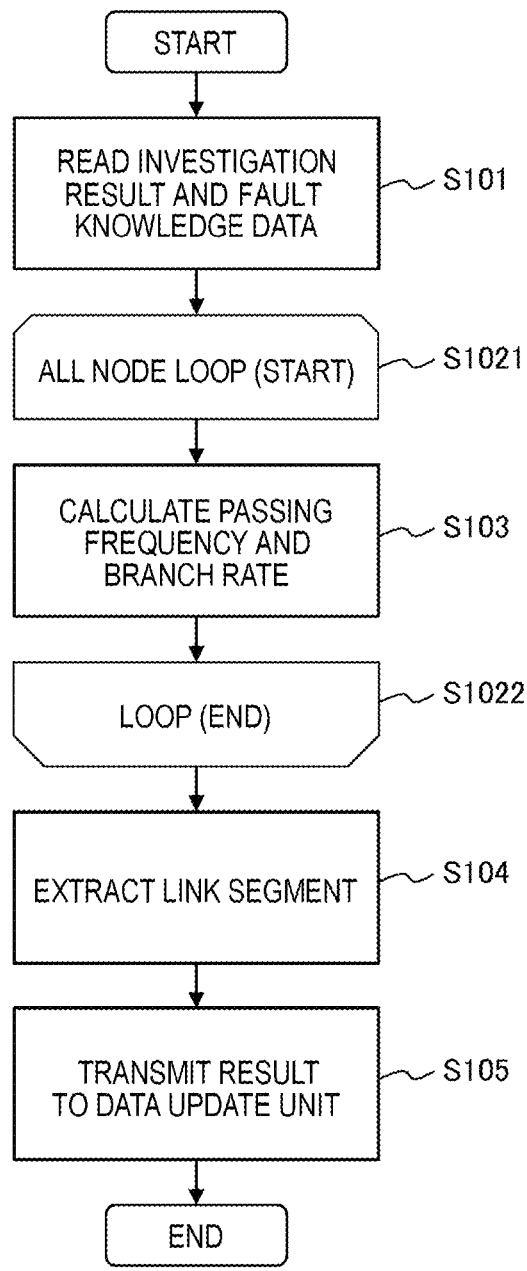
FIG. 9 is a diagram showing an example of a process flow of extracting a main node and a link segment in an update target extraction unit 15.

FIG. 9 shows a process flow of extracting the main mode and the link fragment in the update target extraction unit 15.

In initial process step S101 of extraction of the main node and the link segment in the update target extraction unit 15, the examination work history (examination result data D3) of the maintenance worker Mt is read from the examination result storage unit DB3. Next, a process of process step S103 is performed on all the nodes included in the examination work history acquired between process steps S1021 and S1022. In process step S103, the number of passes and the branch rate for each node are calculated.

After the processing of all the nodes is completed, the main node and the link segment are extracted in process step S104. The main node and the link segment are determined by a predetermined number of passes and a branch rate threshold. Alternatively, several higher main nodes and link segments with a large number of passes and large branch ratios may be extracted. In process step S105, the extracted main node and link segment are transmitted to the data update unit 16.

FIG. 10A shows an example of a description of the main node obtained by the process in process step S105 in FIG. 9. In the data format of the main node, the number of passes of the node ID of the main node (branch amount) and the branch rate to the next nodes (M1.1.3, C1.1.3, and C1.1.2) are stored.

FIG. 10B shows an example of a description of the link segment obtained by the process in process step S105 in FIG. 9. The data format of the link segment includes the node ID of the main node at the start point of the link segment, the node ID of the main node at the end point, and a node column constituting the link segment (M1.1.2⇒C1.1.3⇒E1.2.1⇒M1.2.1). Further, the node ID of the source node of the link constituting the link segment, the node ID of the destination node, the number of passes (frequency), and average working time are stored.

Next, the extraction point A2 (node with many errors) will be described. The node with many errors is a node to be easily mistaken in the examination work until the maintenance worker Mt specifies the cause of the assets 2. Data to be easily mistaken is extracted, and the fault knowledge data is updated in the data update unit 16 so that it is difficult to reach the node to be easily mistaken in the next examination work.

Figure 11:
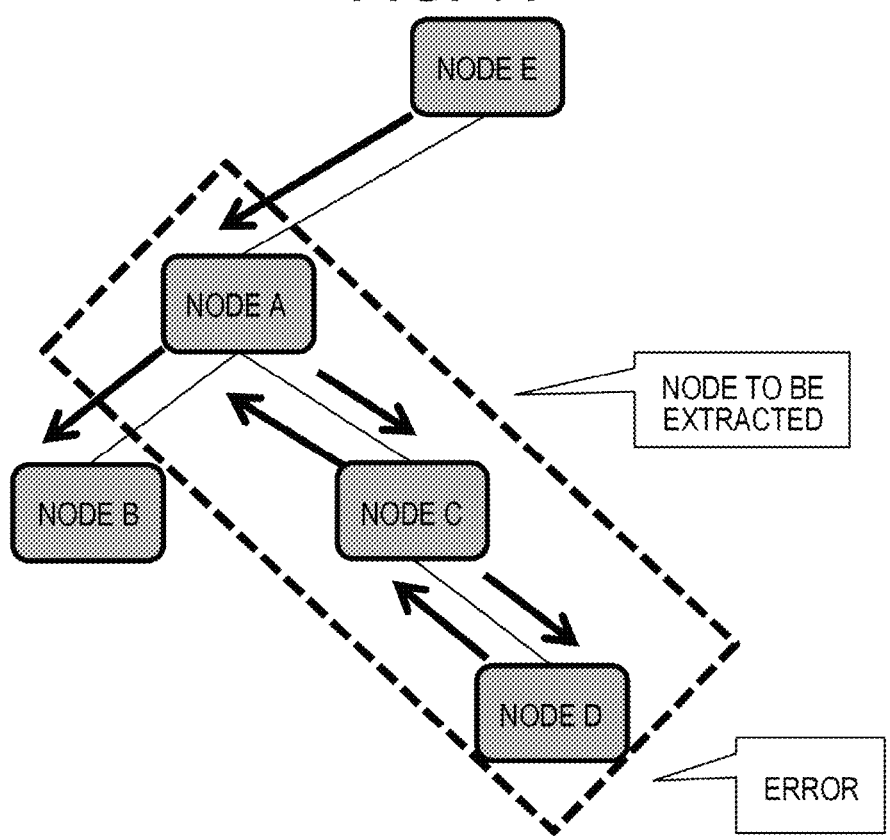
FIG. 11 is a diagram showing an outline of a node to be easily mistaken.

FIG. 11 shows the outline of the node to be easily mistaken. In the case of FIG. 11, the maintenance worker Mt starts a work of specifying a cause location from the node E is started, and reaches the node D through node E⇒node A⇒node C, and as a result, the node D is not the cause of the fault. Therefore, the maintenance worker Mt shows a series of work results in which the work returns to the node A in a reverse route and then is directed to the direction of the node B instead of the node C. Here, it is found that the node B is the cause of the fault, and the examination is ended. Using the link segment of the node A, the node C, and the node D, the number of times the examination is easily mistaken is aggregated.

Figures 12, 13:
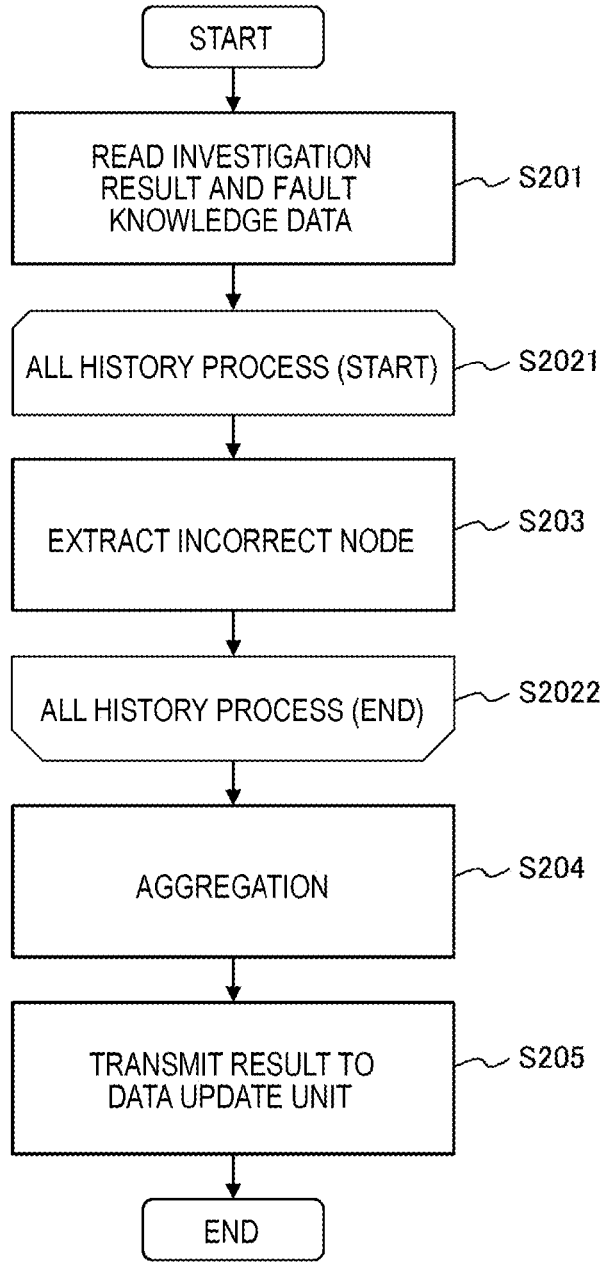
FIG. 12 is a diagram showing an example of a process flow of extracting the node to be easily mistaken in the update target extraction unit 15.
FIG. 13 is a diagram showing an example of a data format of data extracted from the viewpoint of the node to be easily mistaken.

FIG. 12 shows an example of a process flow of extracting a node to be easily mistaken. In initial process step S201 of extraction of the node to be easily mistaken in the update target extraction unit 15, the examination work history (examination result data D3) of the maintenance worker Mt is read from the examination result storage unit DB3.

Next, a process of process step S203 is performed on all the nodes included in the examination work history acquired between process steps S2021 to S2022. In process step S203, the number of passes and the number of errors in each node are calculated. The number of errors is the number of times of returning to a higher node.

After the processing of all the nodes is completed, the node extracted from the viewpoint of "the number of errors" in process step S204 and the link segment are extracted. Specifically, a higher node with a predetermined error number threshold or a large number of errors and the link segment may be extracted. In process step S205, the extracted node with many errors and the link segment are transmitted to the data update unit 16.

FIG. 13 shows a data format of data extracted in the process of process step S205 in FIG. 12. The data format includes the node ID of the source node, the destination node ID, the number of passes (frequency), and the number of errors.

Next, the extraction point A3 (node with a long working time) will be described. In the examination work history (examination result data D3), the working time of each node is recorded. In a case where the working time of each node is long, the maintenance worker Mt takes a long time for the work. For the node with a long working time, the engineer Me can use the data update unit 16 to make the working manual easy to understand or to divide the node into two or more nodes, and thus the working time can be shortened.

Figures 14, 15:
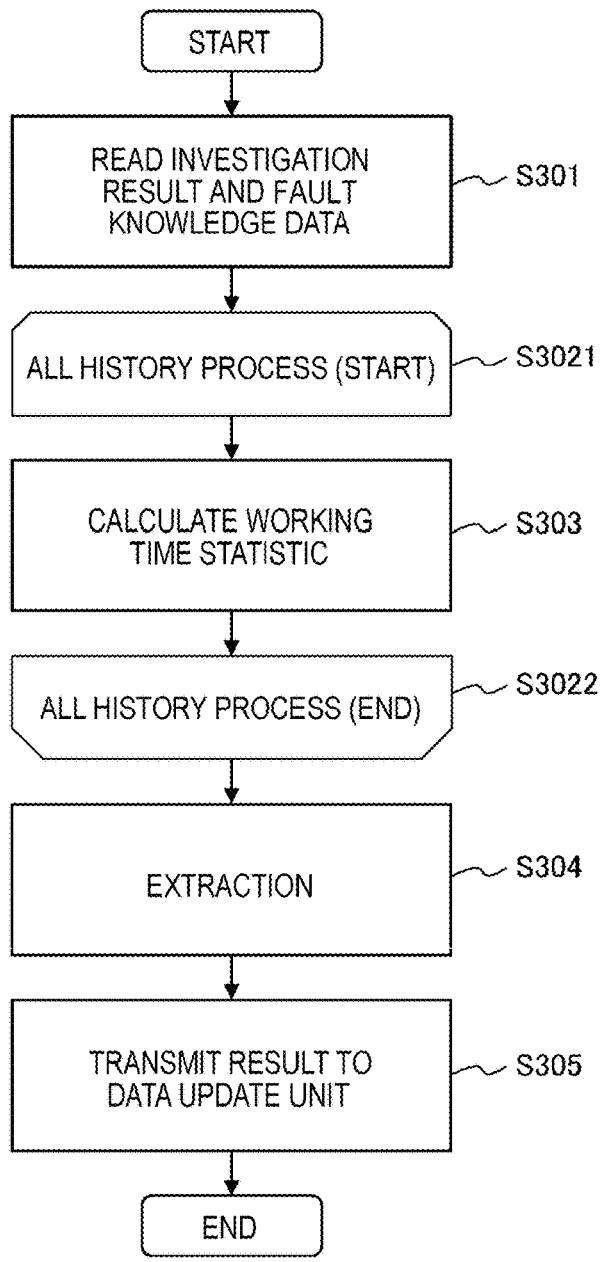
FIG. 14 is a diagram showing an example of a process flow of extracting a node with a long working time.
FIG. 15 is a diagram showing an example of a data format of data extracted from the viewpoint of a node with a long working time.

FIG. 14 shows an example of a process flow of extracting a node with a long working time. In initial process step S301 of extracting a node with a long working time in the update target extraction unit 15, the examination work history (examination result data D3) of the maintenance worker Mt is read from the examination result storage unit DB3.

Next, a process of process step S303 is performed on all the nodes included in the examination work history acquired between process steps S3021 to S3022. In process step S303, the statistic value of working time for each node is calculated.

The statistic value includes the average value and the standard deviation of working time. The node with a long average working time is a node for which all examination workers take time. The node with a large standard deviation in the working time has a large variation in working time by the workers.

After the processing of all the nodes is completed, in process step S304, a node with a large statistic value of working time in each node is extracted. The node is determined by a predetermined average value of working time and a standard deviation threshold. Alternatively, several higher nodes with a large average value or standard deviation may be extracted. In process step S305, the information of the extracted main node is transmitted to the data update unit 16.

FIG. 15 shows an example of a data format of data extracted in the process of process step S305 in FIG. 14. In the data format, the node ID for the extracted node and the statistic value of working time are stored. The average value, standard deviation, maximum value, and the like can be adopted as statistical values for working time.

Finally, the data update unit 16 will be described. The data update unit 16 displays the extraction result of the update target extraction unit 15 on the terminal Te which is a user interface unit, and receives an input from the engineer Me who is a user.

Data update includes adding new knowledge, updating existing knowledge, and deleting existing knowledge. Adding new knowledge is adding new nodes and links. For example, a node with many errors is divided and a node that can suppress errors is added.

Updating existing knowledge is updating a score and additional information included in the node or link. The main node and the link segment are combined into one and the examination work is reconsidered, or when there are too many nodes, the score is reduced so that nodes are not extracted in the work procedure creation unit 13. In addition, the cause of the node with a long working time is determined by the engineer Me, and the examination manual is reconsidered.

Figure 16:
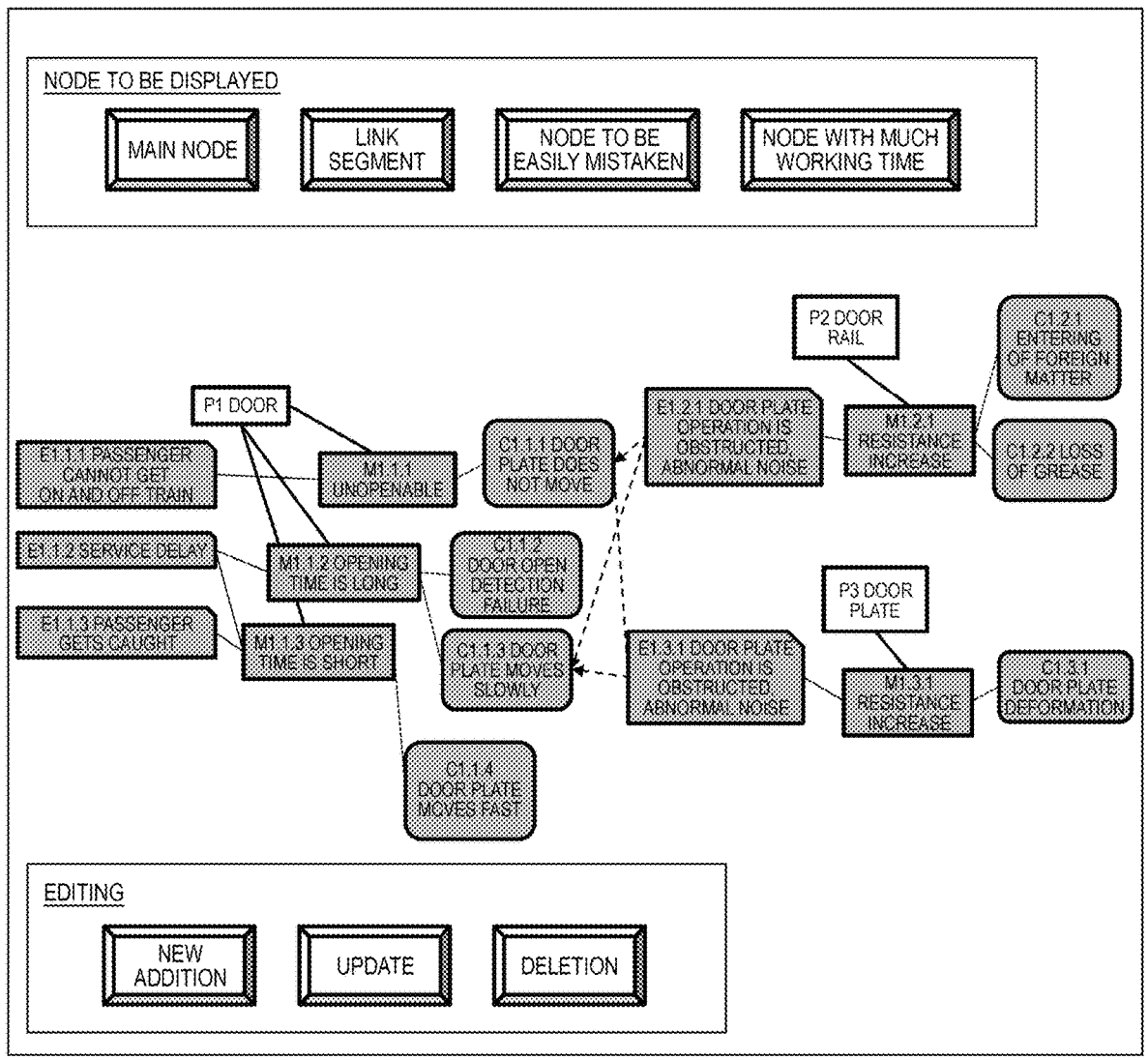
FIG. 16 is a diagram showing an example of a display screen of a terminal Te which is a user interface unit.

FIG. 16 shows an example of the screen of the terminal Te which is a user interface unit. The engineer Me updates fault knowledge data while referring to the screen of FIG. 16.

In the screen example in FIG. 16, for example, a selection screen of a push button format is configured such that the screen is divided into upper, middle and lower stages, as nodes to be displayed in the upper stage, a main node, a link segment, a node to be easily mistaken, a node with a long working time, and the like can be selected. In the lower stage, a selection screen of a push button format is configured to select and instruct works such as new addition, update, and deletion as editing works. In addition, in the middle stage, a node display is performed in the graph format shown in FIG. 4 and the results of selection and support by the upper and lower stages can be reflected in the graph format, or various data can be displayed.

As described above, according to the embodiment of the present invention, a location to be updated with fault knowledge data from the accumulated examination work history is shown to the engineer Me and the engineer Me updates the knowledge by looking the extraction result of the location where fault knowledge data is to be update.

The present invention is not limited to the above-described embodiment and includes various modifications. For example, the above-described embodiment have been described in detail for easy understanding of the present invention, and the present invention is not necessarily limited to those having all the configurations described.

In addition, each of the configurations, the functions, the processing units, the processing sections, and the like described above may be realized in hardware by designing apart or all thereof, for example, in the integrated circuit. In addition, each of the configurations, the functions, and the like may be realized in software by interpreting and executing a program by which a processor realizes each of the functions. Information such as a program realizing each function, a table, and a file can be included in a recording device such as a memory, a hard disk, or a solid state drive (SSD), or in a recording medium such as an IC card, an SD card, and a DVD.

In addition, it is considered that a control line or an information line is necessary for description, and both of the control line and the information line are not necessarily shown for a product. In practice, it may be considered that almost all configurations are connected to each other.

What is claimed is:

1. A fault finding support system for instructing a maintenance worker of an appropriate examination location and examination contents using fault knowledge data in which a causal relationship of fault of a target machine is described, the system comprising:
    an examination procedure creation unit that creates an examination procedure with respect to the examination location and the examination contents of the target machine using the fault knowledge data;
    an examination result storage unit that stores an examination history of performing examination using the examination procedure created by the examination procedure creation unit;
    an update target extraction unit that recommends an update location of the fault knowledge data using the examination history stored in the examination result storage unit; and
    a user interface that provides a function of displaying the update location recommended by the update target extraction unit, receiving an input from a user in response to a display of the update location, and updating the fault knowledge data based on the input from the user.

2. The fault finding support system according to claim 1, wherein
    the examination procedure creation unit externally presents the examination procedure of the target machine created using the fault knowledge data, obtains an examination result of the target machine executed according to the examination procedure as an examination result, and stores the result in the examination result storage unit.

3. The fault finding support system according to claim 1, wherein
    the fault knowledge data in which the causal relationship of fault of the target machine is described is network configuration data with fault modes, fault effects, and fault causes with respect to parts constituting the target machine as nodes, and links between the nodes.

4. The fault finding support system according to claim 3, wherein
    in the fault knowledge data in which the causal relationship of fault of the target machine is described, the examination history is recorded in association with the nodes.

5. The fault finding support system according to claim 3, wherein
    nodes between different parts are linked by an external instruction from the user interface.

6. The fault finding support system according to claim 3, wherein
    the update target extraction unit searches for a frequently used node with respect to the network configuration data and displays the node on the user interface.

7. The fault finding support system according to claim 3, wherein
    the update target extraction unit searches for a node of fault knowledge data that is frequently used easily branched into another node with respect to the network configuration data and displays the node on the user interface.

8. The fault finding support system according to claim 3, wherein
    the update target extraction unit searches for a part of a network connecting frequently used nodes for the network configuration data and displays the part on the user interface.

9. The fault finding support system according to claim 3, wherein
    the update target extraction unit searches for a location which is mistakenly examined by a worker who performs examination on the network configuration data, and displays the location on the user interface.

10. The fault finding support system according to claim 3, wherein
    the update target extraction unit aggregates working time of a worker who performs examination on the network configuration data, calculates a statistic value, and displays the calculated value on the user interface.

* * * * *